(12) United States Patent
Yang

(10) Patent No.: US 10,284,644 B2
(45) Date of Patent: *May 7, 2019

(54) INFORMATION PROCESSING AND CONTENT TRANSMISSION FOR MULTI-DISPLAY

(71) Applicant: Alibaba Group Holding Limited, Grand Cayman (KY)

(72) Inventor: Fuping Yang, Shanghai (CN)

(73) Assignee: Alibaba Group Holding Limited, Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 15/673,250

(22) Filed: Aug. 9, 2017

(65) Prior Publication Data

US 2017/0339227 A1 Nov. 23, 2017

Related U.S. Application Data

(63) Continuation of application No. 14/724,559, filed on May 28, 2015, now Pat. No. 9,762,665.

(30) Foreign Application Priority Data

May 30, 2014 (CN) .......................... 2014 1 0238848

(51) Int. Cl.
*H04L 29/08* (2006.01)
*H04N 21/43* (2011.01)
(Continued)

(52) U.S. Cl.
CPC .......... *H04L 67/1095* (2013.01); *G06F 3/048* (2013.01); *G06F 3/1423* (2013.01);
(Continued)

(58) Field of Classification Search
USPC ....... 709/217, 219, 223, 224, 225, 226, 227, 709/240
See application file for complete search history.

(56) References Cited

U.S. PATENT DOCUMENTS 6,631,840 B1 10/2003 Muramatsu et al.
7,523,067 B1 4/2009 Nakajima
(Continued)

OTHER PUBLICATIONS

Office action for U.S. Appl. No. 14/724,559, dated Nov. 30, 2016, Yang, "Information Processing and Content Transmission for Multi-Display", 12pages.
(Continued)

*Primary Examiner* — Jude Jean Gilles
(74) *Attorney, Agent, or Firm* — Lee & Hayes, P.C.

(57) ABSTRACT

Processing methods and systems for multi-display. The implementations may include establishing, by a computing device, a connection between a controlling terminal and an accessory display device. The computing device may receive activity ID information of a current presentation from the controlling terminal using the established connection, establish a mapping between the current presentation and the accessory display device based on the activity ID information, and transmit a presentation content associated with the current presentation to the accessory display device for display based on the mapping.

20 Claims, 6 Drawing Sheets

(51) Int. Cl.

| | |
|---|---|
| *G06F 3/048* | (2013.01) |
| *G06F 9/451* | (2018.01) |
| *H04L 12/28* | (2006.01) |
| *H04N 21/63* | (2011.01) |
| *G09G 5/00* | (2006.01) |
| *H04N 21/258* | (2011.01) |
| *G06F 3/14* | (2006.01) |
| *G06F 9/44* | (2018.01) |

(52) U.S. Cl.
CPC ............ *G06F 3/1454* (2013.01); *G06F 9/452* (2018.02); *G09G 5/00* (2013.01); *H04L 12/2807* (2013.01); *H04L 12/2816* (2013.01); *H04L 67/02* (2013.01); *H04L 67/125* (2013.01); *H04L 67/141* (2013.01); *H04L 67/28* (2013.01); *H04N 21/25833* (2013.01); *H04N 21/4307* (2013.01); *H04N 21/631* (2013.01); *H04L 2012/2849* (2013.01)

(56) References Cited

U.S. PATENT DOCUMENTS

| | | | | |
|---|---|---|---|---|
| 7,627,650 | B2* | 12/2009 | Koning | H04L 29/06 370/254 |
| 7,667,707 | B1* | 2/2010 | Margulis | G06F 3/1431 345/1.1 |
| 8,767,686 | B2* | 7/2014 | Hoecker | H04W 24/00 370/338 |
| 9,762,665 | B2* | 9/2017 | Yang | G06F 3/1423 |
| 2001/0051915 | A1 | 12/2001 | Ueno et al. | |
| 2005/0192727 | A1 | 9/2005 | Shostak et al. | |
| 2006/0282855 | A1* | 12/2006 | Margulis | G06F 3/1431 725/43 |
| 2007/0000369 | A1 | 1/2007 | Okuyama | |
| 2007/0236453 | A1 | 10/2007 | Maynard et al. | |
| 2007/0282750 | A1 | 12/2007 | Homiller | |
| 2008/0040274 | A1 | 2/2008 | Uzo | |
| 2008/0102809 | A1* | 5/2008 | Beyer | G01C 21/00 455/420 |
| 2009/0019031 | A1 | 1/2009 | Krovitz et al. | |
| 2009/0248441 | A1 | 10/2009 | Okada | |
| 2009/0305680 | A1 | 12/2009 | Swift et al. | |
| 2010/0110904 | A1* | 5/2010 | Wimmer | H04L 1/22 370/248 |
| 2011/0019181 | A1 | 1/2011 | De Waele et al. | |
| 2011/0119734 | A1* | 5/2011 | Crawford | G06F 21/34 726/3 |
| 2011/0191811 | A1 | 8/2011 | Rouse et al. | |
| 2011/0239142 | A1 | 9/2011 | Steeves et al. | |
| 2011/0267291 | A1 | 11/2011 | Choi et al. | |
| 2011/0289106 | A1 | 11/2011 | Rankin, Jr. et al. | |
| 2012/0023398 | A1 | 1/2012 | Hoshino et al. | |
| 2012/0023447 | A1 | 1/2012 | Hoshino et al. | |
| 2012/0098638 | A1* | 4/2012 | Crawford | G06F 21/34 340/5.6 |
| 2012/0297464 | A1 | 11/2012 | Busch et al. | |
| 2013/0016032 | A1* | 1/2013 | Margulis | G06F 1/266 345/2.3 |
| 2013/0076531 | A1 | 3/2013 | San Vicente et al. | |
| 2013/0279300 | A1 | 10/2013 | Iwase et al. | |
| 2013/0311889 | A1 | 11/2013 | Davis | |
| 2014/0089821 | A1 | 3/2014 | Rios, III et al. | |
| 2014/0095285 | A1 | 4/2014 | Wadell et al. | |
| 2014/0101535 | A1* | 4/2014 | Kim | G06F 3/1431 715/234 |
| 2014/0115643 | A1 | 4/2014 | Meredith et al. | |
| 2014/0285399 | A1 | 9/2014 | Jain et al. | |
| 2015/0039737 | A1 | 2/2015 | Smith et al. | |
| 2015/0113411 | A1 | 4/2015 | Underwood et al. | |
| 2015/0178725 | A1 | 6/2015 | Poetsch | |
| 2015/0350320 | A1 | 12/2015 | Yang | |

OTHER PUBLICATIONS

The PCT Search Report and Written Opinion dated Aug. 20, 2015 for PCT application No. PCT/US2015/032996, 13 pages.
Translated Chinese Office Action for Chinese Patent Application No. 201410238848.8, dated Jan. 3, 2018, a counterpart foreign application of U.S. Appl. No. 15/673,250, 11 pages.
Translated Chinese Search Report for Chinese Patent Application No. 201410238848.8, dated Dec. 21, 2017, a counterpart foreign application of U.S. Appl. No. 15/673,250, 2 pages.

* cited by examiner

INFORMATION PROCESSING AND CONTENT TRANSMISSION FOR MULTI-DISPLAY

CROSS REFERENCE TO RELATED PATENT APPLICATIONS

This application claims priority to and is a continuation of U.S. patent application Ser. No. 14/724,559 filed May 28, 2015, entitled "Information Processing and Content Transmission for Multi-Display," which claims priority to Chinese Patent Application No. 201410238848.8, filed on May 30, 2014, entitled "Methods and systems for information processing and content transmission for multi-display," which are hereby incorporated by reference in their entirety.

TECHNICAL FIELD

Implementations herein relate to computing technologies and, more specifically, to methods and systems for information processing and content transmission for multi-display.

BACKGROUND

Multi-screen interactive technology refers to operations between different operating systems and different presentation devices. The technology allows the devices to achieve data transmission via wireless connections. A user may simultaneously display contents in different screens and control these screens through intelligent terminals. The operating systems include IOS®, ANDROID®, WIN7®, WINDOWS XP®, VISTA®, etc., and the devices include smart phones, smart tablet, computer, TV. The data information may include HD video, audio, images, documents etc.

There are a number of protocols to support the multi-screen interaction, such as AirPlay®, Digital Living Network Alliance (DLNA), WiPlug, WiDi, Intelligent Grouping & Resource Sharing protocol (IGRS) protocol. Airplay® and DLNA are the most widely used multi-screen techniques.

Airplay® embodies a wireless communication technique developed by Apple®. Airplay® allows users to use licensed speaker docks, AV receivers and stereo systems and other equipment to consume entire iTunes music library wirelessly. ITunes® is a digital media player application for Mac and PC use. It is a free application that can manage and play digital music and video. Airplay® belongs to a proprietary communication protocol to share multimedia data between heterogeneous devices within a local area network (LAN). Airplay® devices have two categories: client terminals and server terminals. The smaller device may be implemented as Airplay® clients and the larger devices may be implemented as Airplay® servers. For example, iPhone®, iPad®, iPod® generally are considered as Airplay® client terminals, while iTV®, Macbook® Airplay® as Airplay® server terminals. Between Airplay® client and server terminals, data such as videos, photos and music are shared. To implement Airplay®, Airplay® service is first released so that IOS® devices can find the service; Airplay® protocol response is then implemented to allow interactive data to be exchanged among IOS® devices.

DLNA is a multi-screen interactive technology resource sharing protocol standard to achieve connectivity between devices as well as to achieve interconnection and interoperability capabilities. DLNA is developed based on the DLNA protocol or IGRS protocol via WI-FI network on different multimedia terminal. For example, intelligent terminals may include mobile phones, tablets etc., which may run operating systems (IOS®, Android®, Windows®, etc.). Among these terminals, multimedia (audio, video, and image) transmission, sharing, data parsing, display, and/or a series of control operations may be performed. DLNA may allow different platforms to share and display contents, enriching multimedia user experience. In these instances, multiple-display devices may be connected, and data may be shared and converted among these devices. For example, movies may be played on a mobile device, a picture on a tablet may be displayed on a TV, and a content of the computer may be projected on the TV.

Accordingly, Airplay® and DLNA based multi-screen technologies are implemented among two devices that are in the same local network and have to adopt the same protocol such as Airplay® or DLNA protocol. Therefore, each of Airplay® and DLNA based multi-screen display technology not only has limited access to a particular display device, but also lack support of remote mobile access to multiple screens in different locations (e.g., different LANs). These techniques have problems to add/remove display devices during data sharing and to display contents among display devices in different locations.

SUMMARY

Implementations herein relate to information processing methods and systems for multi-display. Some implementations resolve problems of conventional techniques that, for example, do not support displaying shared resources using a large number of displays in different locations. This Summary is not intended to identify all key features or essential features of the claimed subject matter, nor is it intended to be used alone as an aid in determining the scope of the claimed subject matter.

Implementations herein relate to information processing methods for multi-display. An information processing method may include establishing, by a computing device, individual connections with a controlling terminal and an accessory display device. The computing device may receive activity ID information of a current presentation from the controlling terminal using the connection established therewith, and establish a mapping between the current presentation and the accessory display device based on the activity ID information. The computing device may further transmit a presentation content associated with the current presentation to the accessory display device for display based on the mapping.

In some implementations, the establishing the connection between the controlling terminal and the accessory display device may include establishing persistent connections with the controlling terminal and the accessory display device.

In some implementations, the persistent connection may include a Transmission Control Protocol (TCP) persistent connection, a Hypertext Transfer Protocol (HTTP) persistent connection, or a socket persistent connection. The receiving the activity Identification (ID) information of the current presentation from the controlling terminal using the established connection may include receiving an unique ID (e.g., ID number) associated with the current presentation from the controlling terminal, and receiving synchronization information associated with the presentation content of the current presentation from the controlling terminal.

In some implementations, the establishing the mapping between the current presentation and the accessory display device based on the activity ID information may include assigning an ID code to the accessory display device, receiving a request for establishing the mapping with the accessory display device from the controlling terminal, and establishing a correspondence between the activity ID information of the current presentation and the ID code of the designated accessory display device.

In some implementations, the assigning the ID code to the accessory display device may include generating hash codes using a hash algorithm based on a number of connected accessory display devices, and assigning a hash code to an individual accessory display device of the connected accessory display devices as the ID code.

In some implementations, the receiving the request for establishing the mapping with the accessory display device from the controlling terminal may include issuing the ID code of the accessory display device to the controlling terminal, and receiving the request for establishing the mapping with an accessory display device corresponding to the ID code from the controlling terminal.

In some implementations, the transmitting a presentation content associated with the current presentation to the accessory display device for display based on the mapping may include receiving the controlling signal of the current presentation from the controlling terminal, transmitting the controlling information to the accessory display device corresponding to the current presentation based on the mapping, receiving, from the accessory display device, a request for downloading the presentation content, and issuing, to the accessory display device, the presentation content that is synchronized between the controlling terminal and a server terminal.

In some implementations, the transmitting a presentation content associated with the current presentation to the accessory display device for display based on the mapping may include receiving a controlling signal of the current presentation and the presentation content from the controlling terminal, transmitting the controlling information to the accessory display device corresponding to the current presentation based on the mapping, and receiving, from the accessory display device, a request for downloading the presentation content, and issuing, to the accessory display device, the presentation content that is transmitted from the controlling terminal to a server terminal.

Implementations herein relate to information processing systems for multi-display. An information processing system may include a connection establishing module configured to establish individual connections with a controlling terminal and an accessory display device, an information receiving module configured to receive activity ID information of a current presentation from the controlling terminal using the connection established therewith, a mapping module configured to establish a mapping between the current presentation and the accessory display device based on the activity ID information, and a presentation delivering module configured to transmit a presentation content associated with the current presentation to the accessory display device for display based on the mapping.

In some implementations, the connection establishing module may be further configured to establish persistent connections with the controlling terminal and the accessory display device. The information receiving module may include an ID number receiving module configured to receive a unique ID associated with the current presentation from the controlling terminal, a synchronization information receiving module configured to receive synchronization information associated with the presentation content of the current presentation from the controlling terminal.

The mapping module may include a distributing module configured to assigning an ID code to the accessory display device, a mapping request module configured to receive a request for establishing the mapping with the accessory display device from the controlling terminal, and an execution module configured to establish a correspondence between the activity ID information of the current presentation and the ID code of the designated accessory display device.

In some implementations, the assigning module may include a hash code generation module configured to generate hash codes using a hash algorithm based on a number of connected accessory display devices, an assigning and execution module configured to assign a hash code to an individual accessory display device of the connected accessory display devices as the ID code.

In some implementations, the mapping request module may include an issuing module configured to issue the ID code of the accessory display device to the controlling terminal, and a request receiving module configured to receive the request for establishing the mapping with an accessory display device corresponding to the ID code from the controlling terminal.

In some implementations, the presentation delivering module may include a control signal receiving module configured to receive a controlling signal of the current presentation from the controlling terminal, a forwarding module configured to transmit the controlling information to the accessory display device corresponding to the current presentation based on the mapping, a download request receiving module configured to receive, from the accessory display device, a request for downloading the presentation content, and an issuing and executing module configured to issue, to the accessory display device, the presentation content that is transmitted from the controlling terminal to a server terminal.

In some implementations, the presentation delivering module may include a control signal and content receiving module configured to receive a controlling signal of the current presentation and the presentation content from the controlling terminal, a forwarding module configured to transmit the controlling information to the accessory display device corresponding to the current presentation based on the mapping, a download request receiving module configured to receive, from the accessory display device, a request for downloading the presentation content, and an issuing and executing module configured to issue, to the accessory display device, the presentation content that is transmitted from the controlling terminal to a server terminal.

Implementations herein relate to methods for transmitting contents for multi-display. The method may include establishing, by a computing device, a connection with a server terminal. The computing device may initialize a current presentation and assign unique activity ID information for the current presentation and transmit the activity ID information to the server terminal.

In some implementations, the mobile terminal may transmit a request for establishing the mapping with the accessory display device to the server terminal, and transmit a controlling signal of the current presentation and the presentation content to the server terminal. The transmitting a request for establishing the mapping with the accessory display device to the server terminal may include receiving, from the server terminal, a ID code of the accessory display device associated with the server terminal. Then, the mobile terminal may transmit, to the server terminal, the request for establishing the mapping with an accessory display device corresponding to the ID code In some implementations, the receiving, from the server terminal, the ID code of the accessory display device associated with the server terminal may include receiving the ID code of the accessory display device issued by the server terminal, scanning a two-dimensional ID code displayed by the accessory display device, receiving a user input including the accessory display device of the accessory display device, or receiving the ID code of the accessory display device via a sound wave.

Implementations herein relate to systems for transmitting contents for multi-display. A system may include a connection establishing module configured to establish a connection with a server terminal, an activity ID assignment module configured to initialize a current presentation and assigning unique activity ID information for the current presentation, a transmitting module configured to transmit the activity ID information to the server terminal, a request transmitting module configured to transmit a request for establishing the mapping with the accessory display device to the server terminal, and an information transmitting module configured to transmit a controlling signal of the current presentation and the presentation content to the server terminal.

In some implementations, the request transmitting module may include an ID code receiving module configured to receive, from the server terminal, a ID code of the accessory display device associated with the server terminal, and a correspondence request transmitting module configured to transmit, to the server terminal, the request for establishing the mapping with an accessory display device corresponding to the ID code.

In some implementations, the ID code receiving module may be further configured to receive the ID code of the accessory display device issued by the server terminal, scan a two-dimensional ID code displayed by the accessory display device, receive a user input including the ID code of the accessory display device, or receive the ID code of the accessory display device via a sound wave.

Compared with conventional techniques, implementations herein have advantages. Implementations herein establish, using a computing device, the connection between a controlling terminal and an accessory display device. The computing device may transmit a presentation content associated with the current presentation to the accessory display device for display based on the mapping. Accordingly, the computing device may establish connections using the ID of the controlling terminal and ID codes of multiple accessory display devices. The connections may be established without limitations on the number of the connections and the locations of the accessory display devices. The connections may be established based on a mapping between the ID of the controlling terminal and an ID code of an individual accessory display device. Therefore, the computing may display, on the accessory display device, presentation contents on the controlling terminal. This may support access to a number of display devices in a multi-display process. By changing the mapping between the controlling terminal and accessory display devices, implementations may dynamically add or remove an accessory display device.

BRIEF DESCRIPTION OF THE DRAWINGS

The Detailed Description is described with reference to the accompanying figures. The use of the same reference numbers in different figures indicates similar or identical items.

DETAILED DESCRIPTION

In the following description, numerous specific details are set forth to describe the present disclosure. However, the present disclosure can be implemented in many other ways than those herein described. Those skilled in the art can make similar implementations without departing from the present disclosure; therefore the present disclosure is not limited by particular implementations described below.

Figure 1:
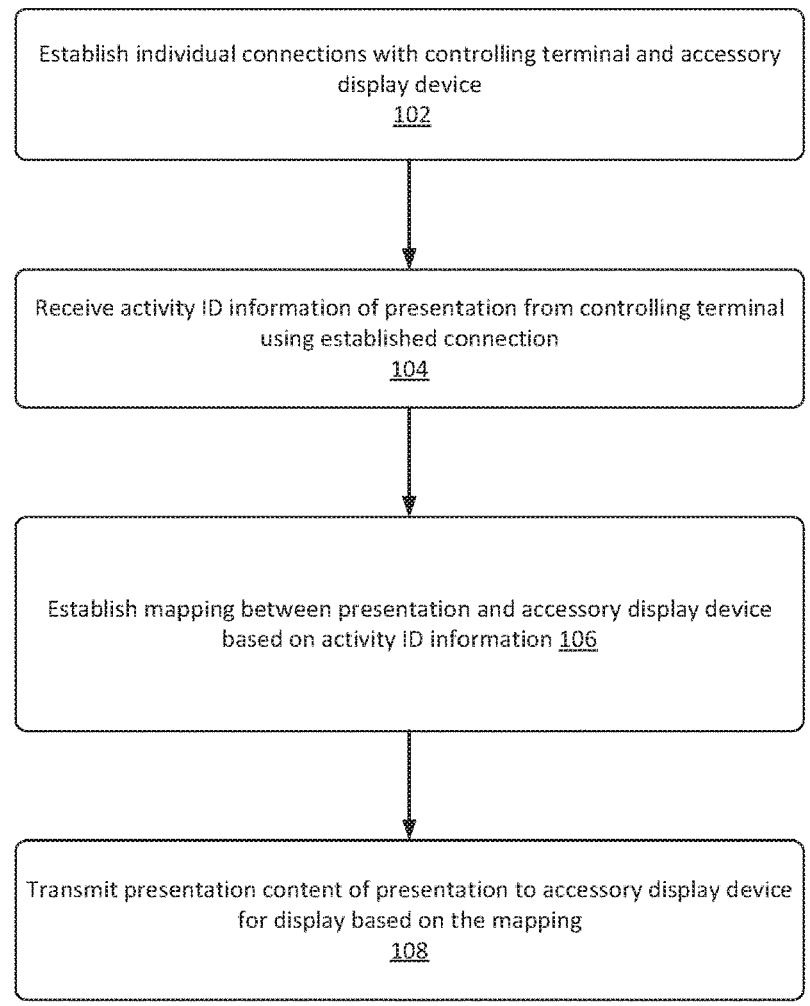
FIG. 1 is a flow chart of an illustrative process for information processing for multi-display.

FIG. 1 is a flow chart of an illustrative process 100 for information processing for multi-display. At 102, connections may be established with the controlling terminal and an accessory display device. For example, a server terminal may facilitate to establish the connections.

The server terminal may receiving activity ID information of a current presentation from the controlling terminal using the established connection at 104.

At 106, the server terminal may establish a mapping between the current presentation and the accessory display device based on the activity ID information.

At 108, the server terminal may transmit a presentation content associated with the current presentation to the accessory display device for display based on the mapping.

Figure 2:
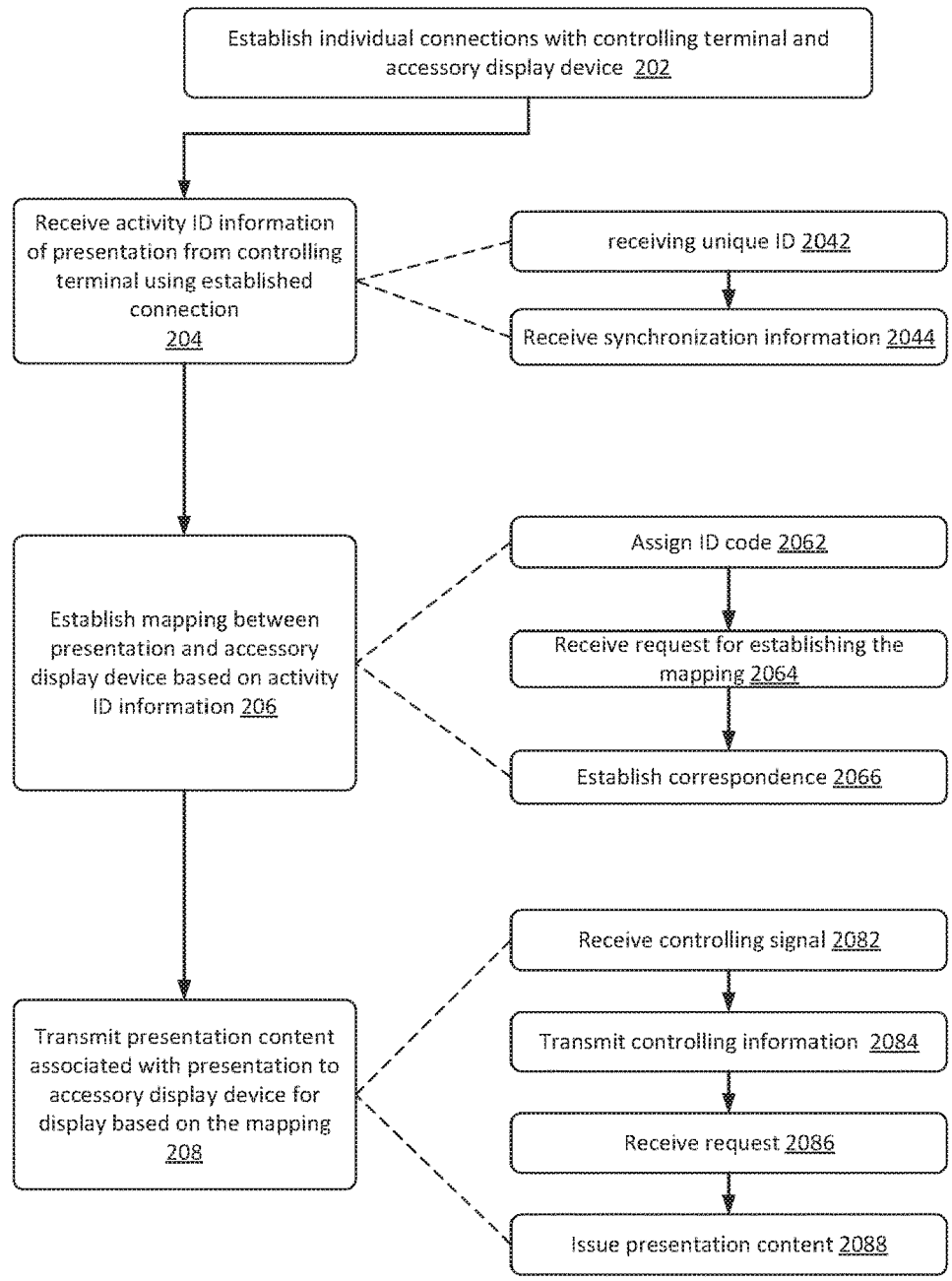
FIG. 2 is a flow chart of an illustrative process for an implementation of information processing for multi-display.

FIG. 2 is a flow chart of an illustrative process 200 for an implementation of information processing for multi-display. In some implementations, the controlling terminal may include a mobile device (e.g., smart phone, tablets PC, and iPad) and the accessory display device may include a monitor (e.g., TV and computer monitor). Implementations herein may display, on the accessory display device, presentation contents on the controlling terminal, supporting access to a number of display devices in a multi-display process.

At 202, connections may be established with a controlling terminal and an accessory display device. In some implementations, persistent connections with a mobile device and a monitor may include a connection that may continuously facilitate transmission of multiple packets. For example, in a connection period, if no transmitted packet is found, tests may be performed on both sides to send link testing packages. In other word, the connections among the mobile device, the monitor, and a server terminal need to be open and/or consistent for a predetermined time period. The persistent connection may include a TCP persistent connection, a HTTP persistent connection, or a socket persistent connection.

In some implementations, after the connection among the mobile device, the monitor, and the server terminal is established, at least two of the mobile device, the monitor, and the server terminal may communicate for a predetermined time period. This may occupy a large amount of system resources. Therefore, the mobile device and/or the monitor may communicate with the server terminal whether the mobile device and/or the monitor are online and whether the data link is still open. This may avoid wasting system resources.

In some implementations, a heartbeat technique may be used to determine status of the persistent connections between the mobile device and the server terminal and/or the monitor and the server terminal. For example, after the persistent connection among the mobile, device, the monitor, and the server terminal is established, the mobile device and/or the monitor may transmit a packet to the server terminal in a predetermined time period. The server terminal may transmit a reply packet to the mobile device and/or the monitor within a predetermined time period after receiving the packet. In response to a determination that the server has not received the packet or the mobile device and/or the monitor have not received the reply packet, it is determined that the connection is abnormal. In these instances, by adopting heartbeat techniques, the system recourses may be saved.

In some implementations, Comet technology may be implemented. Comet is a web push technology for real-time updated massages to be transmitted to a client terminal without a request sent by the client terminal. There are two ways to achieve a long polling and iframe stream. Implementations of HTTP connections and the Comet technology may achieve the persistent connections among the mobile device, the monitor, and the server terminal.

At 204, the server terminal may receive activity ID information of a current presentation from the controlling terminal using the established connection. In these instances, the server terminal may receive a unique ID associated with the current presentation from the controlling terminal at 2042. The presentation content may include pictures, video, PPT presentations or any other activities on the mobile device. The unique ID may be generated using the presentation content. For example, the ID may be the title of the presentation content, a related information of the current presentation, a set of numbers that is randomly generated based on the presentation content as long as the current presentation may be characterized by the ID. In some implementations, the ID may be assigned by the mobile device. In other implementations, the ID may be generated by the server terminal to correspond to the current presentation and/or the mobile device.

At 2044, the server terminal may receive synchronization information associated with the presentation content of the current presentation from the controlling terminal. In these instances, the mobile device may transmit the controlling signal of the presentation and synchronize the presentation content on the server terminal. For example, when the mobile device accesses a folder including pictures or opens the pictures, the pictures may be transmitted to the server terminal or synchronized with a corresponding picture on the server terminal. In some implementations, the presentation content may be transmitted and/or synchronized in other ways between the mobile device and the server terminal. For example, the present content may be transmitted and/or synchronized during the presentation (real-time transmission) and/or before the presentation. For example, the transmission may be triggered by a time, a user activity, or a predetermined portion of the presentation content (e.g., a percentage of the presentation content).

At 206, the mapping may be established between the current presentation and the accessory display device based on the activity ID information. In these instances, an ID code may be assigned to the accessory display device at 2062, which may be implemented by two steps: A) generating hash codes using a hash algorithm based on a number of connected accessory display devices, and B) assigning a hash code to an individual accessory display device of the connected accessory display devices as the ID code. When the accessory display device is television, the ID code may be a screen number that is displayed on the television.

At 2064, the server terminal may receive the request for establishing the mapping with the accessory display device from the controlling terminal. In these instances, the server terminal may transmit the ID code of the television to the mobile device, and receive the request for establishing the mapping with an accessory display device corresponding to the ID code from the controlling terminal. For example, a user may input the ID code of the screen number displayed on the television, and the connection between the mobile device and the television may be established based on the screen number.

At 2066, the server terminal may establish a correspondence between the activity ID information of the current presentation and the ID code of the designated accessory display device. In these instances, the server terminal may map the ID code of the television to the ID of the mobile device based on the mapping request. In some implementations, the server terminal may establish connection between the mobile device and multiple televisions.

At 208, the server terminal may transmit a presentation content associated with the current presentation to the accessory display device for display based on the mapping. In these instances, the server may receive a controlling signal of the current presentation from the controlling terminal at 2082. For example, the mobile device may transmit the controlling signal to the server terminal, and the controlling signal may include a signal associated with one or more presentation gestures and/or actions corresponding to the presentation content.

At 2084, the server terminal may transmit the controlling information to the accessory display device corresponding to the current presentation based on the mapping. For example, the server terminals may transmit the controlling signal to the television having an ID code corresponding to the ID based on the mapping between the ID of the presentation (e.g., viewing pictures) and the ID code of the television.

At 2086, the server terminal may receive, from the accessory display device, a request for downloading the presentation content. For example, the television may transmit to the server terminal the request for downloading the presentation content based on the mapping between the presentation content of the mobile device and the television.

At 2088, the server terminal may issue, to the accessory display device, the presentation content that is transmitted from the controlling terminal to the server terminal. For example, the server terminal may transmit the synchronization information associated with the presentation to the television.

Figure 3:
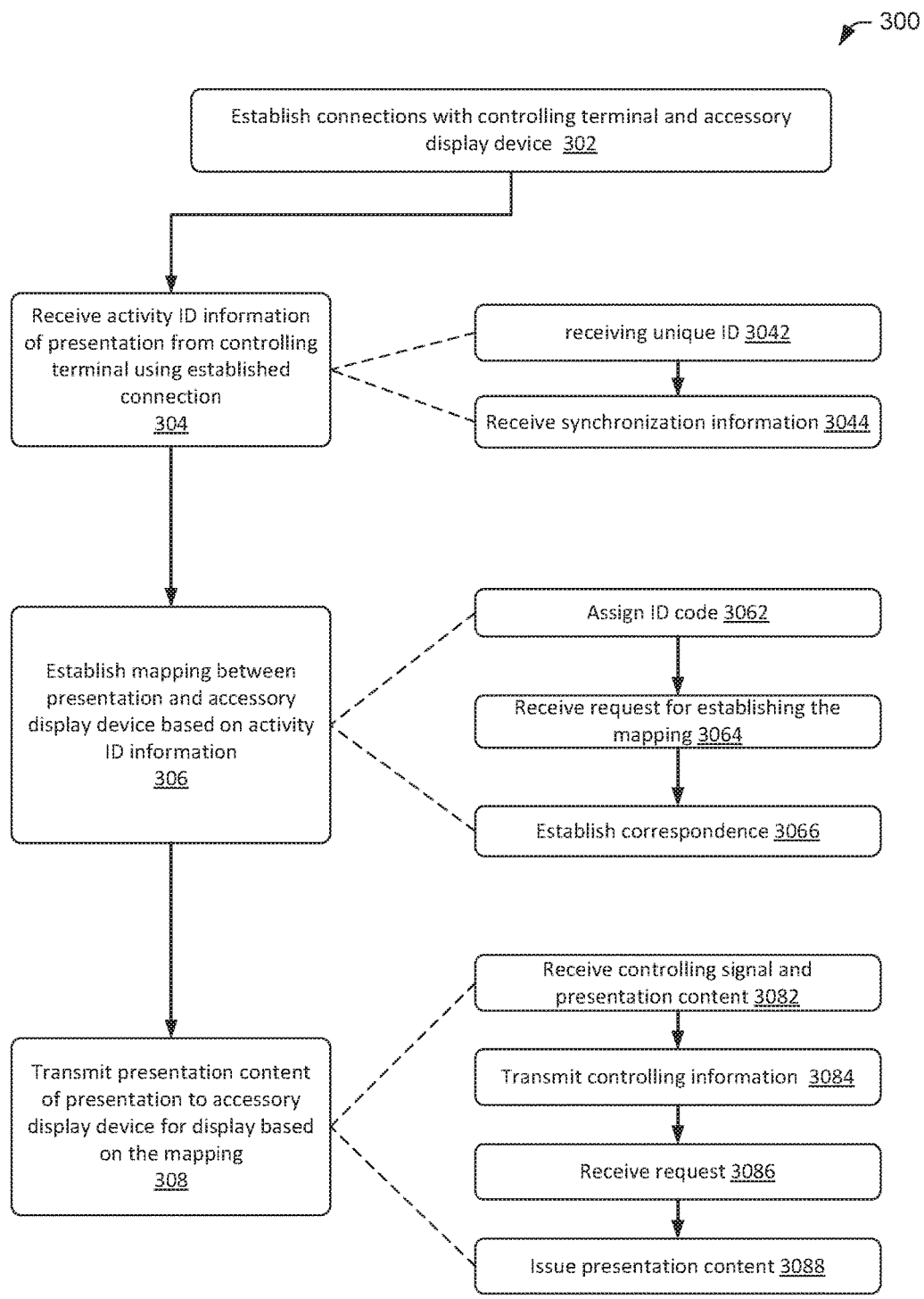
FIG. 3 is a flow chart of an illustrative process for another implementation of information processing for multi-display.

FIG. 3 is a flow chart of an illustrative process 300 for another implementation of information processing for multi-display. The server terminal may transmit a presentation content associated with the current presentation to the accessory display device for display based on the mapping.

At 302, connections may be established with a controlling terminal and an accessory display device.

At 304, the server terminal may receive activity ID information of a current presentation from the controlling terminal using the connection established therewith.

At 3042, the server terminal may receive a unique ID associated with the current presentation from the controlling terminal.

At 3044, the server terminal may receive synchronization information associated with the presentation content of the current presentation from the controlling terminal.

At 306, the mapping may be established between the current presentation and the accessory display device based on the activity ID information. In these instances, an ID code may be assigned to the accessory display device at 2062.

At 3064, the server terminal may receive the request for establishing the mapping with the accessory display device from the controlling terminal.

At 3066, the server terminal may establish a correspondence between the activity ID information of the current presentation and the ID code of the designated accessory display device.

At 308, the server terminal may transmit a presentation content associated with the current presentation to the accessory display device for display based on the mapping. In these instances, the server terminal may receive a controlling signal of the current presentation and the presentation content from the controlling terminal at 3082. For example, the server terminals may transmit the controlling signal to the television having an ID code corresponding to the ID based on the mapping between the ID of the presentation (e.g., viewing pictures) and the ID code of the television.

At 3084, the server terminal may transmit the controlling information to the accessory display device corresponding to the current presentation based on the mapping.

At 3086, the server terminal may receive, from the accessory display device, a request for downloading the presentation content.

At 3088, based on the request, the server terminal may issue, to the accessory display device, the presentation content that is transmitted from the controlling terminal to a server terminal. For example, the server terminal may transmit the synchronization information associated with the presentation to the television for display.

Figure 4:
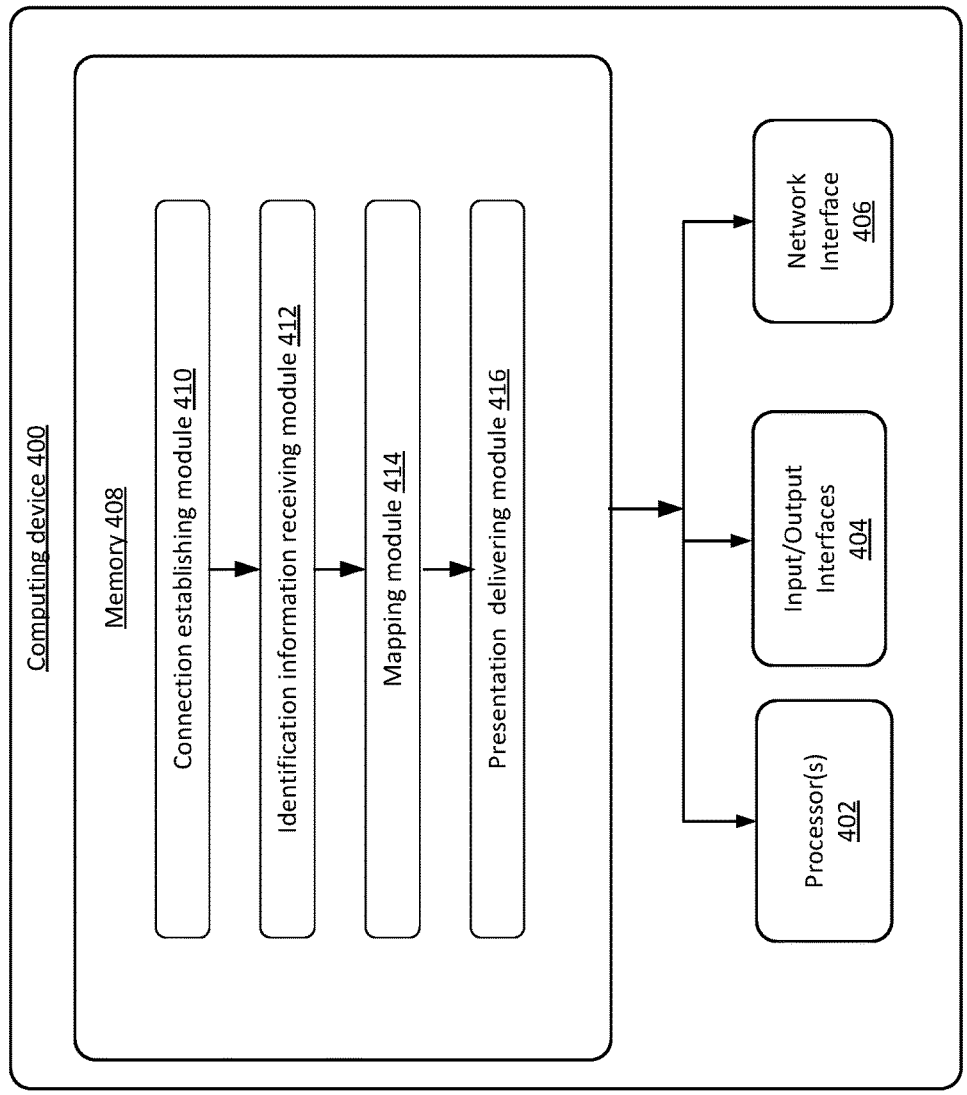
FIG. 4 is a schematic diagram of an illustrative computing architecture that enables information processing for multi-display.

FIG. 4 is a schematic diagram of an illustrative computing architecture 400 that enables information processing for multi-display. The computing device 400 (e.g., a server terminal) may be a user device or a server for a multiple location login control. In one exemplary configuration, the computing device 400 includes one or more processors 402, input/output interfaces 404, network interface 406, and memory 408.

The memory 408 may include computer-readable media in the form of volatile memory, such as random-access memory (RAM) and/or non-volatile memory, such as read only memory (ROM) or flash RAM. The memory 408 is an example of computer-readable media.

Computer-readable media includes volatile and non-volatile, removable and non-removable media implemented in any method or technology for storage of information such as computer readable instructions, data structures, program modules, or other data. Examples of computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. As defined herein, computer-readable media does not include transitory media such as modulated data signals and carrier waves.

Turning to the memory 408 in more detail, the memory 408 may include a connection establishing module 410, an identification information receiving module 412, a mapping module 414, and a presentation delivering module 416. The connection establishing module 410 may be configured to establish connections with a controlling terminal (a mobile device) and an accessory display device (a television). The identification information receiving module may 412 be configured to receive activity ID information of a current presentation from the mobile device using the connection established therewith. The identification information receiving module 412 may be configured to receive a unique ID associated with the current presentation from the controlling terminal. The synchronization information receiving module may be configured to receiving synchronization information associated with the presentation content of the current presentation from the controlling terminal.

The mapping module 414 may be configured to establish the mapping between the current presentation and the accessory display device based on the activity ID information.

In some implementations, the mapping module may include a distributing module configured to assign an ID code to the accessory display device, a mapping request module configured to receive a request for establishing the mapping with the accessory display device from the controlling terminal, and an execution module configured to establish a correspondence between the activity ID information of the current presentation and the ID code of the designated accessory display device.

In some implementations, the assigning module may include a hash code generation module configured to generate hash codes using a hash algorithm based on a number of connected televisions, and an assigning and execution module configured to assign a hash code to an individual television of the connected accessory display devices as the ID code.

In some implementations, the mapping request module may include an issuing module configured to issue the ID code of the accessory display device to the mobile device, and a request receiving module configured to receive the request for establishing the mapping with a television corresponding to the ID code from the mobile device.

The presentation delivering module may be configured to transmit a presentation content associated with the current presentation to the television for display based on the mapping. In some implementations, the presentation delivering module may include a control signal receiving module configured to receive a controlling signal of the current presentation from the mobile terminal, and a forwarding module configured to transmit the controlling information to the television terminal corresponding to the current presentation based on the mapping, a download request receiving module configured to receive, from the television terminal, a request for downloading the presentation content, and/or an issuing and executing module configured to issue, to the television terminal, the presentation content that is transmitted from the mobile terminal to a server terminal.

In some implementations, the presentation delivering module may further include a control signal and content receiving module configured to receive a controlling signal of the current presentation and the presentation content from the mobile terminal, a forwarding module configured to transmitting the controlling information to the television terminal corresponding to the current presentation based on the mapping, a download request receiving module configured to receive, from the television terminal, a request for downloading the presentation content, and/or an issuing and executing module configured to issue, to the television terminal, the presentation content that is transmitted from the mobile terminal to a server terminal.

Implementations herein relate to establishing, using a computing device, the connection between the controlling terminal and the accessory display device. The computing device may transmit a presentation content associated with the current presentation to the accessory display device for display based on the mapping. Accordingly, the computing device may establish connections using the ID of the controlling terminal and ID codes of multiple accessory display devices. The connections may be established without limitations on the number of the connections and the locations of the accessory display devices. The connections may be established based on a mapping between the ID of the controlling terminal and an ID code of an individual accessory display device. Therefore, the computing may display, on the accessory display device, presentation contents on the controlling terminal. This may support access to a number of display devices in a multi-display process. By changing the mapping between the controlling terminal and accessory display devices, implementations may dynamically add or remove an accessory display device.

Figure 5:
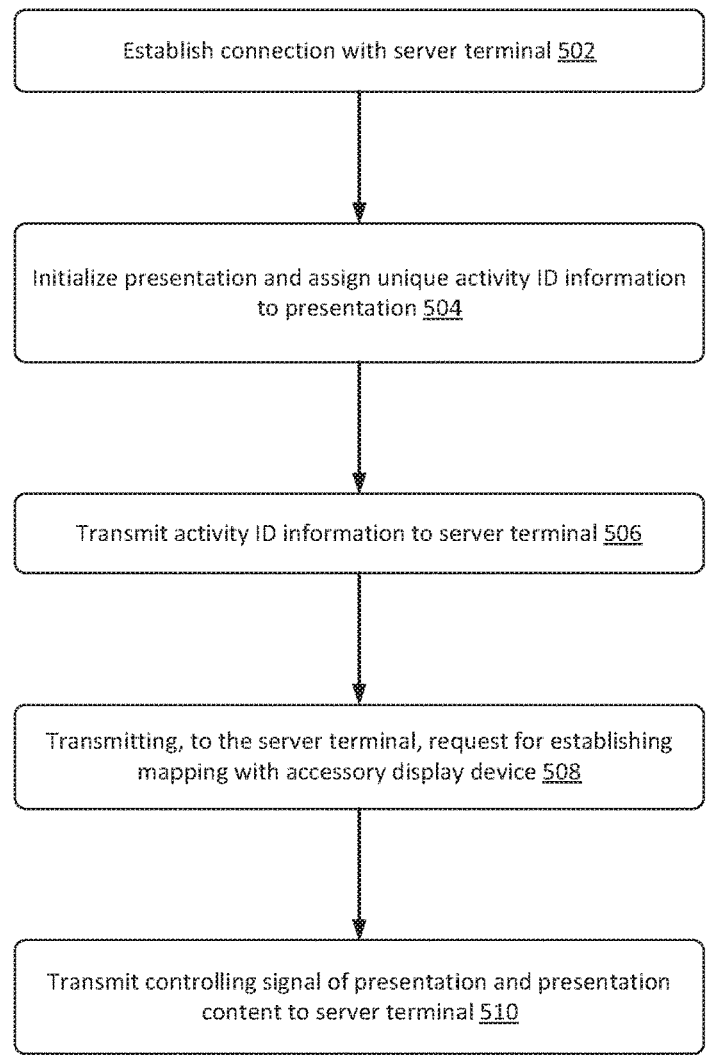
FIG. 5 is a flow chart of an illustrative process for content transmission from a controlling terminal for multi-display.

FIG. 5 is a flow chart of an illustrative process 500 for content transmission from a controlling terminal for multi-display. At 502, a controlling terminal and/or an accessory display device may establish a connection with a server terminal. In these instances, a connection may be established between a controlling terminal (a mobile device) and an accessory display device (a television terminal). For example, the connection may include a persistent connection using heartbeat techniques At 504, the server terminal, the controlling, or an accessory display device may initialize a current presentation and assign unique activity ID information for the current presentation. For example, operations on the mobile terminal on predetermined times may initialize the required presentation content, and the activity ID information may be assigned accordingly. The activity ID information may include a unique ID.

At 506, the controlling device or the accessory display device may transmit the activity ID information to the server terminal. For example, the mobile terminal may transmit the unique ID and synchronization information associated with the presentation content of the current presentation to the server terminal.

At 508, the mobile terminal may transmit a request for establishing the mapping with the accessory display device to the server terminal. In some implementations, the mobile terminal may receive, from the server terminal, an ID code of the television terminal. The mobile terminal may transmit, to the server terminal, the request for establishing the mapping with an accessory display device corresponding to the ID code. In these instances, the server terminal may assign ID codes to television terminals in various ways. The mobile terminal may receive the ID code of the accessory display device issued by the server terminal, scan a two-dimensional ID code displayed by the accessory display device, receive a user input including the ID code of the accessory display device, or receive the ID code of the accessory display device via a sound wave.

At 510, the mobile device may transmit a controlling signal of the current presentation and the presentation content to the server terminal. Two examples of the steps of the information processing method may refer to the above-described implementations associated with multi-display. In some implementations, requests may include requests for establishing connections between a mobile terminal and a television terminal, and/or for establishing mapping between the activity ID information of the presentation on the mobile device and the television terminal. The requests may be transmitted to the server terminal from the mobile terminal or the television terminal respectively.

Figure 6:
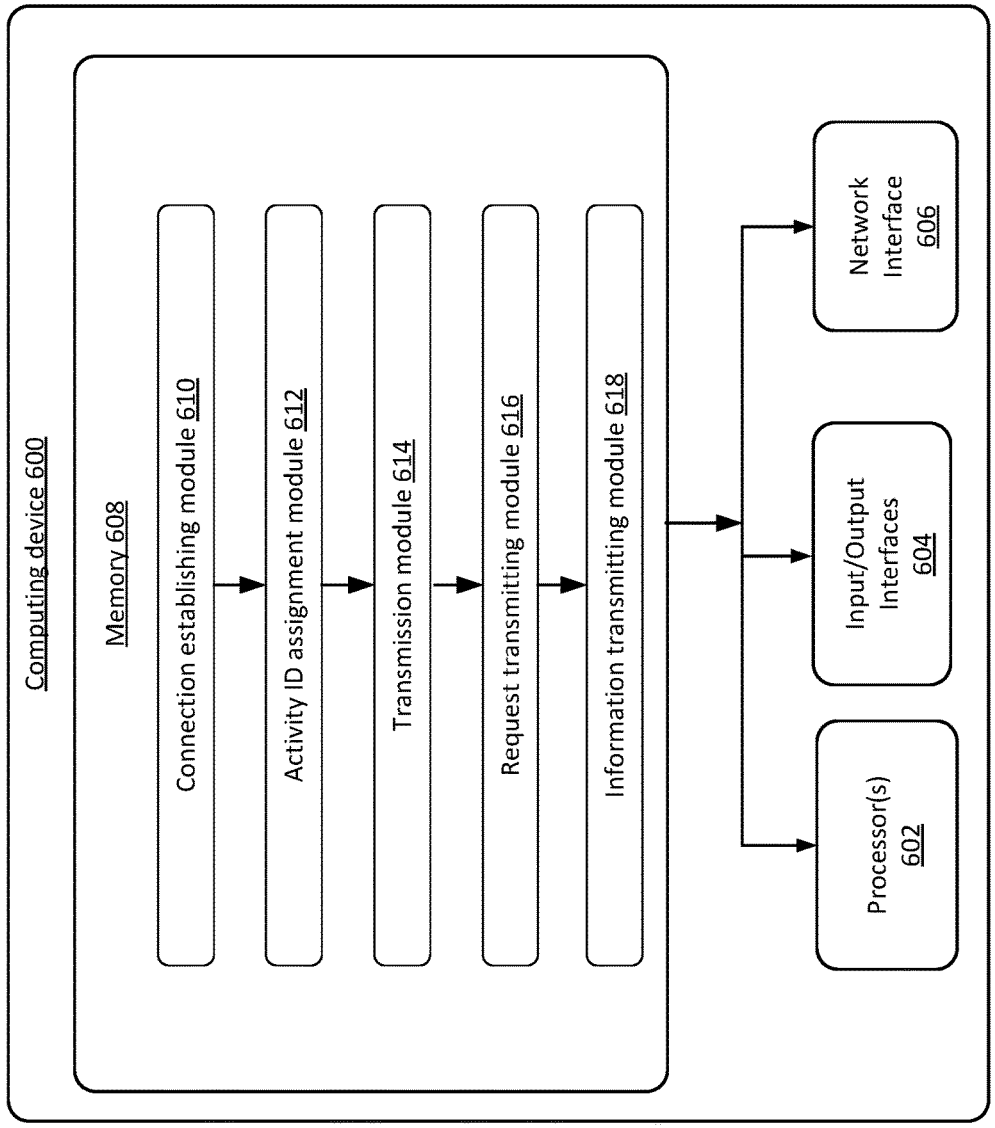
FIG. 6 is a schematic diagram of an illustrative computing architecture that enables content transmission from a controlling terminal for multi-display.

FIG. 6 is a schematic diagram of an illustrative computing architecture that enables content transmission from a controlling terminal for multi-display. The computing device 600 (e.g., a controlling device and an accessory display device) may be a user device or a server for a multiple location login control. In one exemplary configuration, the computing device 600 includes one or more processors 602, input/output interfaces 604, network interface 606, and memory 608.

The memory 608 may include computer-readable media in the form of volatile memory, such as random-access memory (RAM) and/or non-volatile memory, such as read only memory (ROM) or flash RAM. The memory 608 is an example of computer-readable media.

Computer-readable media includes volatile and non-volatile, removable and non-removable media implemented in any method or technology for storage of information such as computer readable instructions, data structures, program modules, or other data. Examples of computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. As defined herein, computer-readable media does not include transitory media such as modulated data signals and carrier waves.

Turning to the memory 608 in more detail, the memory 608 may include a connection establishing module 610, an activity ID assignment module 612, a transmission module 614, a request transmitting module 616, an information transmitting module 618. The connection establishing module 610 may be configured to establish a connection with a server terminal. The activity ID assignment module 612 may be configured to initialize a current presentation and assigning unique activity ID information for the current presentation. The transmission module 614 may be configured to transmit the activity ID information to the server terminal. The request transmitting module 616 may be configured to transmit a request for establishing the mapping with the accessory display device to the server terminal. The information transmitting module 618 may be configured to transmit a controlling signal of the current presentation and the presentation content to the server terminal. The request transmitting module 616 may include an ID code receiving module configured to receive, from the server terminal, an ID code of the television terminal, a correspondence request transmitting module configured to transmit, to the server terminal, and the request for establishing the mapping with an accessory display device corresponding to the ID code. The ID code receiving module may be further configured to receive the ID code of the accessory display device issued by the server terminal, scan a two-dimensional ID code displayed by the accessory display device, receive a user input including the ID code of the accessory display device, or receive the ID code of the accessory display device via a sound wave.

Implementations herein relate to establishing, using a computing device, the connection between the controlling terminal and the accessory display device. The computing device may receiving a controlling signal of the current presentation from the controlling terminal. The computing device may transmitting a controlling signal of the current presentation and the presentation content to the server terminal. The server terminal may receive, from the accessory display device, a request for downloading the presentation content. If multiple accessory display devices are associated with the controlling terminal, the presentation may be displayed on the multiple accessory display devices. The connections may be established without limitations on the number of the connections and the locations of the accessory display devices.

The implementations are merely for illustrating the present disclosure and are not intended to limit the scope of the present disclosure. It should be understood for persons in the technical field that certain modifications and improvements may be made and should be considered under the protection of the present disclosure without departing from the principles of the present disclosure.

What is claimed is:

1. A method comprising:
   establishing a first connection with a computing device;
   receiving activity identification (ID) information of a presentation from the computing device via the first connection;
   receiving a request for establishing a mapping with an accessory display device from the computing device;
   establishing the mapping between the presentation and the accessory display device based on the activity ID information; and
   transmitting presentation content associated with the presentation to the accessory display device via a second connection with the accessory display device based at least in part on the mapping.

2. The method of claim 1, wherein the first connection and the second connection are persistent connections including a transmission control protocol (TCP) connection, a hypertext transfer protocol (HTTP) connection, or a socket connection.

3. The method of claim 1, further comprising receiving the presentation content from the computing device via the first connection.

4. The method of claim 1, wherein establishing the mapping comprises:
   assigning an ID code to the accessory display device; and
   establishing a correspondence between the activity ID information of the presentation and the ID code of the accessory display device.

5. The method of claim 4, wherein assigning the ID code to the accessory display device comprises:
   generating one or more hash codes using a hash algorithm based at least in part on a number of connected accessory display devices; and
   assigning a hash code of the one or more hash codes to the accessory display device as the ID code.

6. The method of claim 1, wherein transmitting the presentation content associated with the presentation to the accessory display device comprises:
   receiving controlling information of the presentation from the computing device; and
   transmitting the controlling information to the accessory display device corresponding to the presentation based at least in part on the mapping.

7. The method of claim 1, wherein transmitting the presentation content associated with the presentation to the accessory display device further comprises:
   receiving a request for downloading the presentation content from the accessory display device; and
   issuing the presentation content that is synchronized with the computing device to the accessory display device.

8. The method of claim 1, further comprising receiving synchronization information associated with the presentation content of the presentation from the computing device.

9. One or more computer-readable media storing executable instructions that, when executed by one or more processors of a computing device, cause the one or more processors to perform acts comprising:
   establishing a connection with a server terminal;
   initiating a presentation associated with the connection;
   transmitting activity identification (ID) information of the presentation to the server terminal;
   transmitting a request for establishing a mapping with an accessory display device to the server terminal; and
   transmitting controlling information of the presentation and a presentation content to the server terminal to cause the server terminal to send the presentation content to the accessory display device for displaying the presentation content.

10. The one or more computer-readable media of claim 9, the acts further comprising generating the activity ID information for the presentation.

11. The one or more computer-readable media of claim 9, wherein the activity ID information comprises at least one of a title of the presentation content, related information of the presentation content, or a set of numbers randomly generated based at least in part on the presentation content.

12. The one or more computer-readable media of claim 9, wherein the controlling information comprises a signal associated with one or more presentation gestures and/or actions corresponding to the presentation content.

13. The one or more computer-readable media of claim 9, the acts further comprising:
   transmitting a packet to the server terminal in a first predetermined time period; and
   determining a status of the connection based at least in part on whether a reply packet is received from the server terminal in a second predetermined time period.

14. A server terminal comprising:
   one or more processors;
   memory storing executable instructions that, when executed by the one or more processors, cause the one or more processors to perform acts comprising:
   establishing a first connection with a computing device;
   receiving activity identification (ID) information of a presentation from the computing device via the first connection;
   receiving a request for establishing a mapping with an accessory display device from the computing device;
   establishing the mapping between the presentation and the accessory display device based on the activity ID information; and
   transmitting presentation content associated with the presentation to the accessory display device via a second connection with the accessory display device based at least in part on the mapping.

15. The server terminal of claim 14, wherein establishing the mapping comprises:
assigning an ID code to the accessory display device; and
establishing a correspondence between the activity ID information of the presentation and the ID code of the accessory display device.

16. The server terminal of claim 15, wherein assigning the ID code to the accessory display device comprises:
generating one or more hash codes using a hash algorithm based at least in part on a number of connected accessory display devices; and
assigning a hash code of the one or more hash codes to the accessory display device as the ID code.

17. The server terminal of claim 14, wherein transmitting the presentation content associated with the presentation to the accessory display device comprises:
receiving controlling information of the presentation from the computing device; and
transmitting the controlling information to the accessory display device corresponding to the presentation based at least in part on the mapping.

18. The server terminal of claim 14, wherein transmitting the presentation content associated with the presentation to the accessory display device further comprises:
receiving a request for downloading the presentation content from the accessory display device; and
issuing the presentation content that is synchronized with the computing device to the accessory display device.

19. The server terminal of claim 14, the acts further comprising receiving synchronization information associated with the presentation content of the presentation from the computing device.

20. The server terminal of claim 14, the acts further comprising receiving the presentation content from the computing device via the first connection.

* * * * *